(12) United States Patent
Hannikainen et al.

(10) Patent No.: US 11,019,036 B2
(45) Date of Patent: May 25, 2021

(54) METHOD FOR PRIVACY PROTECTION

(71) Applicant: F-Secure Corporation, Helsinki (FI)

(72) Inventors: Heikki Hannikainen, Vihti (FI); Igor Afanasiev, Helsinki (FI)

(73) Assignee: F-Secure Corporation, Helsinki (FI)

(*) Notice: Subject to any disclaimer, the term of this patent is extended or adjusted under 35 U.S.C. 154(b) by 305 days.

(21) Appl. No.: 15/978,300

(22) Filed: May 14, 2018

(65) Prior Publication Data

US 2018/0337895 A1    Nov. 22, 2018

(30) Foreign Application Priority Data

May 19, 2017   (GB) .................................... 1708043

(51) Int. Cl.
| | |
|---|---|
| *G06F 21/60* | (2013.01) |
| *H04L 29/06* | (2006.01) |
| *G06F 9/54* | (2006.01) |
| *H04L 29/08* | (2006.01) |
| *G06F 16/903* | (2019.01) |
| *G06F 16/955* | (2019.01) |
| *G06F 21/62* | (2013.01) |

(52) U.S. Cl.
CPC ............ *H04L 63/0407* (2013.01); *G06F 9/54* (2013.01); *G06F 16/903* (2019.01); *G06F 16/9566* (2019.01); *G06F 21/6245* (2013.01); *H04L 63/1408* (2013.01); *H04L 67/02* (2013.01); *H04L 67/22* (2013.01); *H04L 67/2814* (2013.01); *H04L 67/2842* (2013.01); *H04L 63/0272* (2013.01)

(58) Field of Classification Search
CPC .................................. G06F 21/60; G06F 21/62
USPC ........................................ 713/185; 726/22, 26
See application file for complete search history.

(56) References Cited

U.S. PATENT DOCUMENTS

| | | | |
|---|---|---|---|
| 2005/0257250 A1* | 11/2005 | Mitchell ............... | H04L 63/102 726/3 |
| 2013/0067588 A1 | 3/2013 | Roy et al. ........................ | 726/26 |
| 2014/0019518 A1* | 1/2014 | Nepper ............... | G06F 16/9574 709/203 |
| 2017/0099359 A1 | 4/2017 | Bejerasco et al. | |

* cited by examiner

*Primary Examiner* — Izunna Okeke
(74) *Attorney, Agent, or Firm* — Harrington & Smith

(57) ABSTRACT

There is provided a method for privacy protection including: identifying an API request being related to a tracking service; generating and sending a predetermined number of initial requests to the tracking service when processing the API requests to the tracking service; storing the initial requests and respective responses related to the initial requests from the API in a database; analysing body objects of the stored initial requests and respective responses and generating a dynamic response recipe on the basis of the analysis; and generating a response including a response body acceptable by the tracking process on the basis of the generated dynamic response recipe.

23 Claims, 4 Drawing Sheets

METHOD FOR PRIVACY PROTECTION

TECHNICAL FIELD

The exemplary and non-limiting embodiments of the present application are related generally to methods, apparatuses and computer programs and, more specifically, to the field of privacy protection.

BACKGROUND

Website visitor tracking is used to analyse visitor behaviour on a website. The use of tracking can be controversial when this relates to private individuals. The problems with over tracking are clear: excessive tracking wastes time and bandwidth: third-party trackers follow individuals around the web wherever they go and it is not clear to everyone how companies really use the data they acquire by tracking, where is it stored and who has access to it.

There are already different ways to block tracking. However, really sophisticated trackers are persistent enough to find another way to extract the data content they want. Being bombarded with these more persistent tracking URLs when the initial tracking URL was blocked and did not return to the tracking server is becoming more and more common. Eventually, after all the persistent methods have been used, the remote tracking server will still have an accurate tracking profile of the user. Blocking tracking cookies altogether may also cause other problems. For example, certain webpages may only load properly when the tracking information was properly sent and received by a tracking server. One attempt to solve problems with tracking is to send random cookie data to the tracking servers instead of blocking cookie sending. However, sophisticated tracking servers are able to detect fake data that is not being expected.

There is a need for protecting user privacy so as to make the online experience of the user still smooth while tracking is prevented and for example cookies may be blocked while at the same time the client-side tracking software assumes they are accepted.

SUMMARY

Various aspects of examples of the invention are set out in the claims.

According to an aspect of the invention, there is provided a method as specified in claim 1.

According to an aspect of the invention, there is provided an apparatus as specified in claim 13.

According to an aspect of the invention there is provided a non-transitory computer storage medium as specified in claim 23.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims. Embodiments of the invention are defined in the depended claims.

BRIEF DESCRIPTION OF THE DRAWINGS

The accompanying drawings provide a more complete understanding of the embodiments of the present invention according to the following descriptions.

DETAILED DESCRIPTION

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

Figure 1:
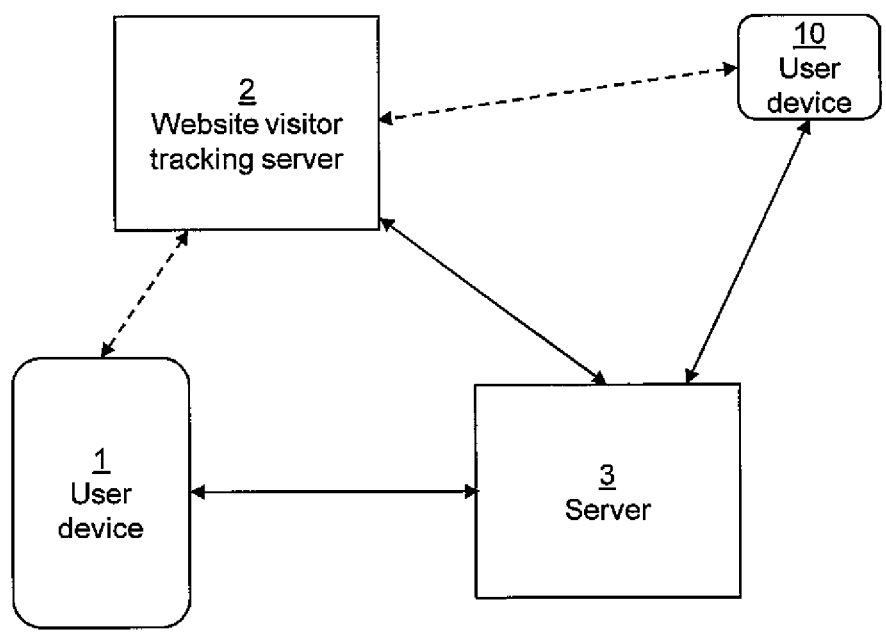
FIG. 1 illustrates schematically in a block diagram an exemplary network architecture.
Figure 4:
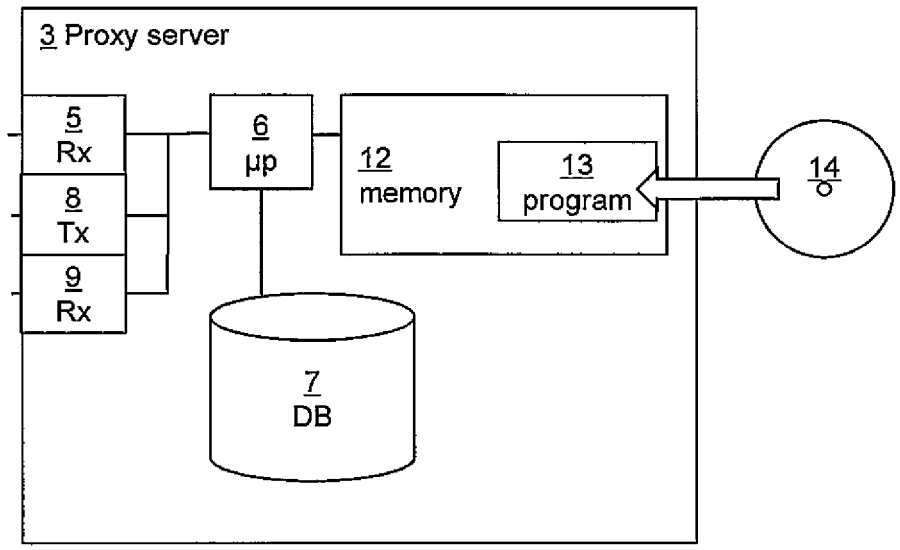
FIG. 4 illustrates schematically in a block diagram a server.
Figure 5:
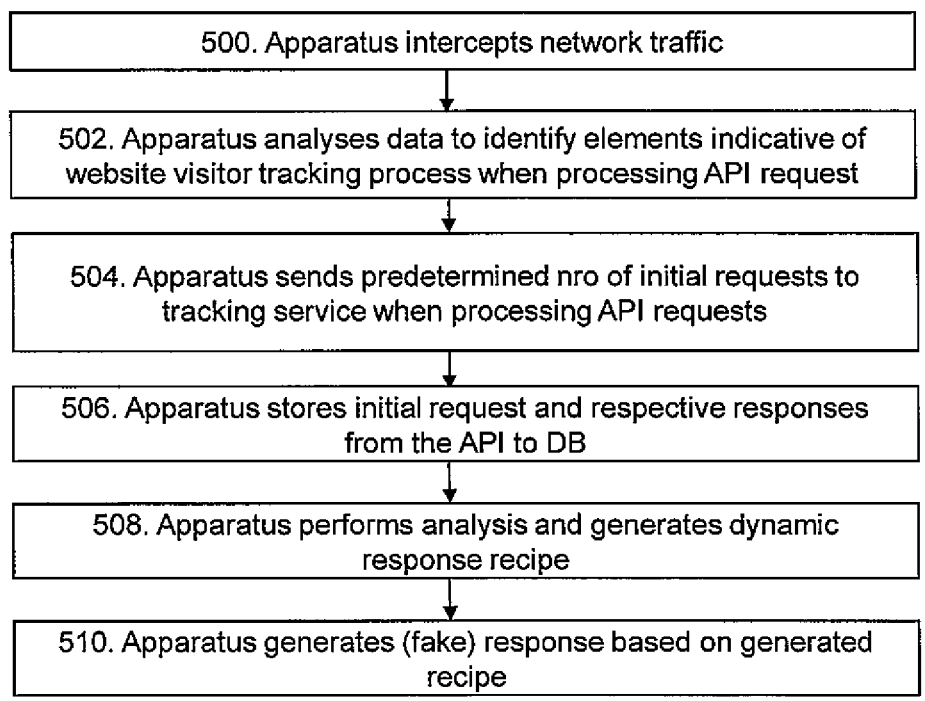
FIG. 5 is a flow diagram showing exemplary steps.

FIGS. 1, 4 and 5 illustrate general examples of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in the figures. The connections shown are logical connections and the actual physical connections may be different. It is apparent to a person skilled in the field that the arrangement may also comprise other functions and structures. For example, the functional entities of the user device 1 may physically reside in separate locations also. Some or part of the device processes may be implemented using cloud computing in which resources are provided to a local client on an on-demand basis, usually by means of the Internet.

FIG. 1 shows a simple network architecture in which user devices 1, 10, such as personal computers, smartphones, mobile phones, laptops or tablets, are in communication with other network elements such as web resources 2 in the Internet. A web resource may refer to targets of uniform resource locators (URLs) but may also be a referent of any uniform resource identifier or internationalized resource identifier. The web resource may comprise every 'thing' or entity that can be identified, named, addressed or handled, in any way, in the web at large, or in any network information system. The user devices 1, 10 are in communication with a server 3 and can also connect to other data sources. The server 3 may comprise a proxy server added between user devices 1, 10 and any servers hosting resources on the web 2. Any requests addressed to the resource from the user devices may be received at the proxy server 3 and be forwarded to a server associated with the resource. The devices may connect by any suitable communications network, for example via the Internet.

Tracking may be enabled by using data from client-side cookies or from other data elements that are read by different visitor tracking websites/servers for different reasons. A cookie is a small piece of data that is placed on the user device by a website that is visited. For example, every time the user device loads a certain website, the browser sends the cookie back to the server to notify the website of the user's activity. Other data elements that can be used for tracking purposes may comprise any of: small data files, pieces of code, script files, text files used to store and transmit data to the tracking server. If cookies are blocked or rejected by the user device, then it may be very difficult for users to have their-website logins remembered anywhere or for websites to keep track of shopping carts.

Privacy services such as F-Secure FREEDOME® have been designed to block HTTP API request made by analytics client libraries in an effort to reduce tracking of users. These API request upload information from the user's web browsers and other applications which have tracking libraries embedded in them. The requests contain unique per-user and per-device identifiers which allow the $3^{rd}$ party analytics services to build a comprehensive picture of each user's actions on the Internet, on websites and in the mobile application ecosystem.

A privacy service, such as FREEDOME®, may, for example, employ an HTTP proxy, which intercepts requests and looks up the destination URLs from a reputation database (ORSP (Object Reputation Service Protocol)/NRS (Network reputation service)). When the reputation database indicates an URL is used by an API of a tracking service, the HTTP proxy may block the request and return a "403 Forbidden" response to the client. Returning a "403 Forbidden" response is correct according to the HTTP protocol and lets the client know that the request is being denied.

However, there are a few drawbacks to this. Firstly, tracking data may be queued and then leaked later on to the tracking server. Many client libraries choose to queue data in a local storage when they cannot upload it. They will try to upload again later and repeat the upload attempts until they succeed. In the case of F-Secure FREEDOME®, it is possible that the user will at some point have the FREEDOME® VPN connection disabled and the data is then uploaded successfully. Secondly, upload retries consume energy. Some clients retry uploads using relatively short time intervals (e.g. 30 seconds, 1 minute, 5 minutes). These retransmission attempts consume battery power on a mobile device, increase network traffic which on a mobile device may be billed by volume, and slightly increase load on servers. Thirdly some clients are buggy and applications are known to crash if the tracking upload fails. In addition to crashing of applications, they may go into a loop, continuously retrying the same request.

There are proposed herein methods and apparatus to protect the user's privacy by controlling the type of data that is being sent to any tracking servers. This is done in a way that does not prevent websites from loading while at the same time reduces the risk of tracking sewers gaining user specific data that can be correctly linked to the user. Further, the proposed methods and apparatus prevent tracking data being queued and leaked later on, save resources since further upload attempts will become unnecessary and improves operation of client apparatus by reducing crashing of applications.

Figure 2:
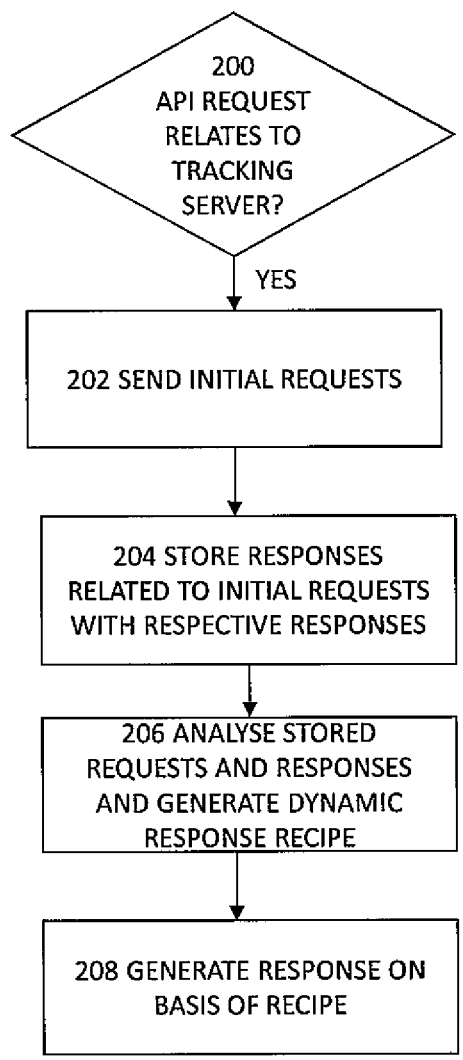
FIGS. 2 and 3 are flow diagrams showing exemplary steps.

FIG. 2 is a flow diagram that illustrates an example method at the server.

In 200, API (application programming interface) requests are monitored and if an API request is identified as being related to a tracking service, then 202 is entered. In an embodiment, the proxy server 3 may learn, based on NRS URL reputation information that the requested URL belongs to a tracking site.

In an embodiment, at least part of network traffic from the user device is intercepted for enabling the monitoring of API requests. There may be predetermined rules on what network traffic to intercept and what network traffic is allowed through. In an embodiment, all traffic may already be passed via a virtual private network and it may be that all network traffic is intercepted. In another embodiment, most traffic can be allowed without intercepting, and the decision on whether there is a need to intercept the network traffic is made based on reputation rating of the target URL, for example. There may also be other predetermined rules as to which network traffic is intercepted.

In an embodiment, the intercepted network traffic is analysed to identify any elements that are indicative of a website visitor tracking process. In an embodiment, the elements indicative of the website visitor tracking process are identified by querying uniform resource locator (URL) reputation from a URL reputation database, for example from the server 3, wherein the URL reputation database maintains data of tracking URLs. If any elements indicative of a website visitor tracking process are identified, then the identified elements may be further analysed to identify any tracking fields comprising user specific data. In an embodiment, the tracking fields comprising user specific data may comprise any of: a GET field, a cookie, an Etag value, or any predetermined field in the network traffic header or request body. Tracking URLs evolve and there will always be new and even customized tracking fields that can appear in the header and those new tracking fields will then be added to the tracking fields to monitor as they are discovered. For example, it can be monitored whether the URL has any parameters in the GET field or is a cookie being submitted or is there an Etag value in the request. The user specific data may be any information that is related to the user and intended to be communicated over the communications/data network. The user specific data may be unique information that can be associated with a specific user device and/or user.

In step 202, a predetermined number of initial requests are sent to the tracking service when processing the API requests from different clients to the tracking service.

In step 204 responses related to the initial requests from the API are stored in a database with the respective requests.

In step 206, body objects of the stored requests and responses are analysed and a dynamic response recipe is generated on the basis of the analysis.

In 208 a response comprising a response body acceptable by the tracking process is generated on the basis of the generated dynamic response recipe.

Figure 3:
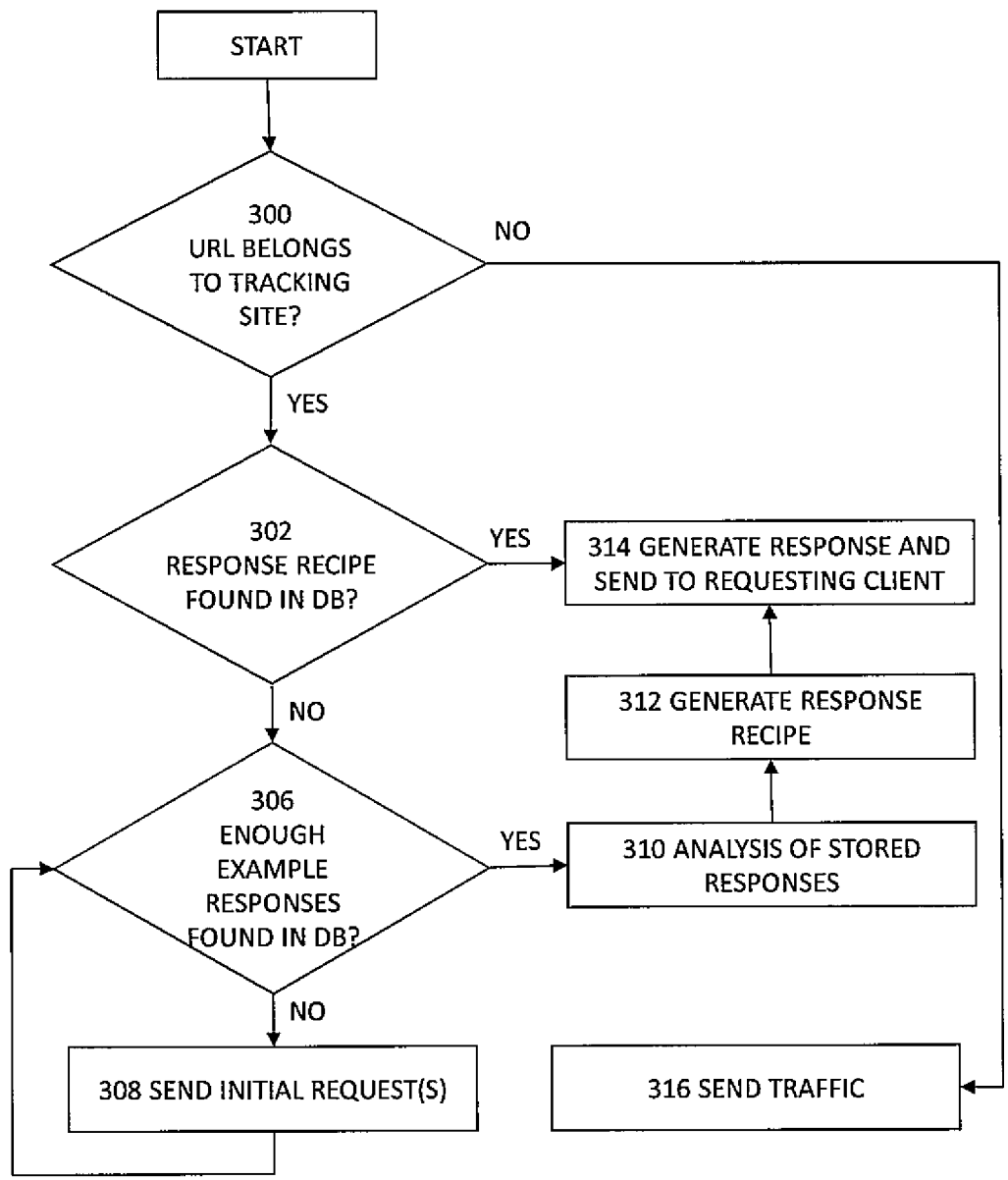

FIG. 3 is another flow diagram illustrating an example of the method.

In 300, in the event that a requested URL is detected to be related to a tracking website, then 302 in entered. If not, then 316 is entered where traffic is allowed to be sent to the requested website. The HTTP proxy 3 may learn, based on NRS URL reputation information, for example, that the requested URL belongs to a tracking website. The NRS/ORSP response may contain category information to explicitly enable or disable positive response generation according to embodiments of the present invention.

In 302, it is checked whether a response recipe relating to the requested URL can be found in a database already. In the event a corresponding response recipe to the requested URL is found, then 314 can be entered where a response is generated on the basis of the response recipe and then sent to the requesting client. The original requests are thus blocked and when the response recipe is available, a specific response is generated and sent to the client. This enables making the client believe (using the fake response) that the request was served by the actual tracking service, while in fact a response recipe was used to generate a believable fake response that looks like a response coming from the origin server.

In an embodiment, if the positive response generation is enabled or not explicitly disabled for the requested URL, the proxy may look up a local cache for previously stored response recipes and/or example responses. If a fresh (not exceeding a predetermined time-to-live value) response recipe is found in the cache, it can be used to generate a response to the client. The request is not forwarded to the origin server and request headers that would normally prevent caching (Cache-Control: no-cache, etc.) may be ignored.

However, in case a response recipe for the requested URL is not found in the database, then 306 is entered where it is detected whether predetermined amount of example responses are found in the database to enable generation of a response recipe for the requested URL. If the predetermined amount of example responses in the database is not reached, then 308 is entered where this initial request is sent to the tracking website and the request and response are stored in the database as an example transaction.

In an embodiment, the proxy may perform a learning request when entering 308. In an embodiment, a best-effort trimming of the initial request may be performed for removing or replacing unique cookies, ETag values and other identifiers. The query is then executed on the origin (tracking) server and the reply from the origin server is cached as an example response even though the client and the server may have forbidden caching by all standard HTTP mechanisms. The response is returned to the client as is.

If a response recipe is not found in the database but predetermined amount of example responses are found in the database, then 310 is entered where the stored example responses are analysed.

In 312 a response recipe is generated on the basis of the analysis of the example responses.

In an embodiment, 312 (generate recipe based on example transactions) is entered when processing a new request and enough examples responses (N=10 for example) have been received. One client transaction before that, with N=9 examples stored, it may be that 308 entered and one more example is fetched, and after that it may be that enough examples (N=10) are available and 312 could be entered immediately and the response recipe could be generated. This way the recipe may be ready, stored and waiting when the next request comes. Thus, 312 would not need to be done at that point (312 might take time to do). 312 may be entered either immediately while processing the client request, or possibly trigger a background analysis service to perform 312.

In an embodiment, it may be checked if a majority of the responses given to different clients are exactly equal and seem like positive responses (e.g. 200 OK with empty response or 1-pixel gif). If that is the case, then such response can be cached as a static response recipe and served simply as a response for further queries. If the response contains ETags, cookies or custom headers, they may be ignored and not sent back together with the response. Alternatively, they may be filled in the response with random values for example.

In an embodiment, if the responses given to different clients are not exactly equal, a series of binary diff operations may be performed on the initial requests and the respective responses to find variable fields and the largest common template. If there is a smaller percentage of responses that are completely different for any similar request, then those can be ignored as exceptional responses, for example.

In an embodiment a dynamic response recipe providing a response template is generated. The template of the response recipe may have format strings to generate random text snippets, hexadecimal strings or UUID-like strings or other formatted random strings of correct length to match what is detected in the real responses. The template may also have format strings that refer to URL parameters or cookie values given in the request. These kind of references can be found by looking for the differing parts of the responses in the respective requests.

In an embodiment, the generated response recipe is stored in the database/cache with a time-to-live field that will trigger regeneration of the response recipe after a configurable time interval. The new response recipe may be used to generate a response to the client.

In 314 the response is generated on the basis of the response recipe generated in 312 and the generated response is sent to the requesting client. Thus, the request is not sent to the tracking service in 314 but the response recipe is used to generate a fake response.

In an embodiment, a VPN client device identifier or a more anonymous hash of one may be stored together with the example responses in order to help identifying responses given to different clients versus responses given to the same client.

In an embodiment response template variables with references to request parameters may not be necessary to implement but static strings of "aaaa" or random hexadecimal strings of the correct length may work just as well at least for some part of client requests.

Many analytics APIs traditionally return a standard minimum-size 1×1 resolution transparent GIF, Content-Type: image/gif (typically 35 or 43 bytes). In an embodiment, 1-pixel transparent GIF images may be handled as special cases or with a generic process of the same image binary being returned from the proxy cache.

When handling APIs with application-level encryption or obfuscation, for example, in the event an API consistently returns different responses every time and a common pattern is not detectable or if the response seems like binary encrypted blob instead of a JSON/XML/text object, the proxy may be required to detect this and go back to returning "403 Forbidden", for example.

Binary difference searching can be expensive and slow if the objects are large. Normal analytics systems have been optimized for minimal bandwidth use and the requests and responses are typically small. In an embodiment, the processing may be skipped for large objects.

Some websites have used analytics libraries in a way which breaks navigation within the site if the analytics uploads fail. If the analytics request in such a case is a normal HTTP request which receives a "200 OK" response, the issues may be fixed by normal implementation. In some cases the analytics service may provide a HTTP 302 redirect response and the user's browser navigates via that URL. The final destination URL is provided to the redirector in an URL parameter. Sometimes these requests have been blocked by a security product proxy, thus breaking navigation. These situations may be handled, for example by parsing the well-known and documented URL format and generating a HTTP 302 redirect locally at the proxy. A ruleset/configuration file may be generated and distributed to the proxies from backend, for example.

The $3^{rd}$ party tracking system will be modified and upgraded at times and in an embodiment, the response recipes are also updated accordingly. The cached response recipe may have a time-to-live field and the $3^{rd}$ party tracking backend needs to be queried again at predetermined, regular intervals for enabling detecting the changes in the responses. Changes in the $3^{rd}$ party tracking system will likely be noticeable from changes in the request being performed by the client. If the request is significantly different when compared with the cached request, the cached response recipe may not be useful. Many major changes may be naturally handled since the request URL will change to point to a new versioned API endpoint. For POST requests, the request body may have to be inspected as well in addition to the requested URL.

In an embodiment, the implementation may be made locally within the HTTP proxy code without employing a separate backend. This may be reasonable for performance and scalability reasons and for ease of implementation. This option may be used for most popular tracking APIs having a significant amount of clients making similar requests to them, for example.

In another embodiment, response recipes may be generated and distributed on backend such that each proxy node is not required to wait and generate their own responses in case it has not been cached yet. This may also make the feature more effective for less popular tracking APIs.

Embodiments of the present invention enable generating an "200 OK" type positive response recipe having an acceptable response body (e.g. JSON, XML or other) in a way that the tracking client library will get an impression that the tracking data would have been accepted. The response body may be generated in an automated fashion by observing the body objects returned by the actual tracking service backend. The body objects can be cached and used as templates for generating dynamic responses. This would solve the problems previously listed.

In an embodiment, the HTTP proxy, when processing an API request to a 3$^{rd}$ party tracking service, which has been identified using other means such as the NRS reputation database, shall pass initial requests to the tracking service. The requests may at this point be made more anonymous, for example, by modifying and randomizing cookie contents and other identifiers in the requests. The proxy shall then cache multiple responses of successful queries from that API with the respective requests made by the client and later compare the differences using a "binary diff" method, for example.

In case the API returns the same static response to all requests, the proxy can start blocking requests to that API URL and return that static, cached response to clients instead of the "403 Forbidden" response.

In case the API returns a response containing some varying fields, such as random-looking identifiers or identifiers given by the client in the request, these fields may be filled by random identifiers having the same format and length and/or even an identifier given by the client. Based on multiple example responses from the API the proxy can generate and cache a dynamic response recipe and later use it to generate unique, but syntactically correct responses to client requests.

The client will then likely accept the fake positive response, deducing that the data was successfully uploaded and ceases to retransmit the data.

Turning now to FIG. 4 that is showing an example of a server 3, such as a proxy server.

A processor 6 is provided that is arranged to intercept at least part of network traffic that is to be transmitted from the user devices 1, 10.

In an embodiment, the processor 6 is arranged to identify an API request being related to a tracking service and to send a predetermined number of initial requests to the tracking service when processing the API requests to the tracking service. The processor 6 is further arranged to store responses and the respective initial requests from the API in a database 7 and to analyse body objects of the stored responses and requests for generating a dynamic response recipe on the basis of the analysis. The processor 6 is also arranged to generate a response comprising a response body acceptable by the tracking process on the basis of the generated dynamic response recipe.

In an embodiment, the processor 6 is arranged to analyse network traffic data of the intercepted network traffic to identify any elements indicative of a website visitor tracking process. However, in some embodiments, this analysis can also be implemented in the some other device external to the server 3. In an embodiment, the processor 6 is arranged to identify the elements indicative of the website visitor tracking process by querying uniform resource locator (URL) reputation from a URL reputation database, wherein the URL reputation database maintains data of tracking URLs.

The processor 6 may be further arranged to analyse the one or more elements indicative of the website visitor tracking process to identify any tracking fields comprising user specific data, in the event that one or more elements indicative of the website visitor tracking process are identified.

In the event that one or more tracking fields with user specific data are identified, the processor may be arranged to replace the user specific data with random tracking field data related to the one or more tracking fields and accepted by the website visitor tracking process when generating the initial requests. In an embodiment, the processor 6 may use a transmitter 8 to transmit initial requests. The random tracking field data may be requested from the database 7. In an embodiment, at least some tracking field data can also be requested from other databases in the network.

The server 3 is provided with a first receiver 5 that receives a request for tracking field data from the user device 1, 10. The request comprises necessary information required to understand what type of tracking field data related to this tracking URL is needed. The request comprises the user specific data the tracking URL is requesting from the user device 1, 10. A processor 6 is configured to compare the received data with stored tracking field data if any. This may be done by querying a database 7, for example. The database is shown in this example as being located at the server 3, but it will be appreciated that the server 3 could alternatively access a remote database. The database 7 may comprise predetermined tracking field data collected from a set of pool client devices. The database 7 may also contain information relating to known URLs and reputation data thereof. There may also be one or more other databases such as a data pool of pregenerated random tracking field data, or the data may be randomly generated when needed.

In an embodiment, the processor 6 may compare the received user specific tracking field data related to the URL to the data stored in the database 7. In an embodiment, the processor 6 is configured to add the received user specific data of the user device 1 to a corresponding data pool of the database 7. This is done for enabling other client devices of the set of client devices to replace their user specific data of one or more tracking fields with the added user specific data. The processor 6 is further configured to select corresponding tracking field data received from another client device earlier but having different content than that of the received user specific data from the user device 1. The selection can be made randomly among the stored tracking field data entries in the requested data pool. The selection of data from the requested data pool can also be made by using a FIFO or LIFO or any other method.

A first transmitter 8 is provided for sending, to the user device 1, a message comprising the selected tracking field data related to the requested URL.

In the above description, the server 3 is described as having different transmitters and receivers. It will be appreciated that these may be disposed in any suitable manner, for example in a single transmitter and receiver, a transceiver and so on. Similarly, a single processor 6 is described but it will be appreciated that the function of the processor may be performed by a single physical processor or by more than one processor.

The server 3 is also provided with a non-transitory computer readable medium in the form of a memory 12. The memory may be used to store a computer program 13 which, when executed by the processor 6, causes the processor 6 to perform the functions described above. Note that the computer program 13 may be provided from an external source 14 such as a carrier wave, a flash disk, a disk and so on.

FIG. 5 is a flow diagram showing exemplary steps at an apparatus, such as a proxy server. In an embodiment, at least some or even all of the method steps can be implemented in any apparatus, for example the user device 1 or the server 3.

500. The apparatus intercepts network traffic when receiving an API request.

502. The apparatus analyses data to identify elements indicative of website visitor tracking process when processing the API request.

504. The apparatus first sends a single request when processing the API request. Thus, the proxy may send one request per each request received from different clients. A request made by a client is first used as an initial request to the origin server as at first there are no more samples. A pool of responses is collected based on a pool of requests made by multiple different client at different times. After a while, when the $n^{th}$ (predetermined number of n) example responses have been received, i.e. requiring n initial requests by tracking clients, the response recipe can be generated.

506. The apparatus stores initial requests and respective responses to a database.

508. The apparatus analyses body objects of the stored responses and respective requests and generates a dynamic response recipe on the basis of the analysis.

510. The apparatus generates a (fake) response comprising a response body acceptable by the tracking process on the basis of the generated dynamic response recipe.

It will be appreciated by the person of skill in the art that various modifications may be made to the above described embodiment without departing from the scope of the present invention. For example, the database may be located in a separate entity to the apparatus, in which case the apparatus will send queries remotely to the database.

The steps, points, signalling messages and related functions described above in relation to FIGS. 2, 3 and 5 are in no absolute chronological order, and some of the steps may be performed simultaneously or in a different order. Other functions may also be executed between the steps or within the steps, and other signalling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor in the exemplary embodiment.

An embodiment provides a computer program product that comprises a non-transitory computer-readable medium bearing a computer program code that is embodied therein for use with a computer. The computer program code comprises a code for identifying an API (application programming interface) request being related to a tracking service, a code for sending a predetermined number of initial requests to the tracking service when processing the API requests to the tracking service, a code for storing responses and the respective initial requests from the API in a database, a code for analysing body objects of the stored responses and the respective initial requests and generating a dynamic response recipe on the basis of the analysis, and a code for generating a response comprising a response body acceptable by the tracking process on the basis of the generated dynamic response recipe.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

The invention claimed is:

1. A method for privacy protection comprising,
at an apparatus: identifying an application programming interface request from at least one client device of a set of client devices being related to a tracking service;
sending a predetermined number of initial requests to the tracking service when processing application programming interface requests to the tracking service;
storing the initial requests and respective responses from the application programming interface related to the tracking service in a database;
analysing body objects of the stored initial requests and respective responses;
based on the analyzing, dynamically generating a dynamic response recipe; on a basis of the analysis;
searching a database for a previously generated response recipe related to the dynamically generated response recipe; and
based on the previously generated response recipe being found in the database, for each further application programing interface request related to the tracking service generating a response comprising a response body acceptable by a tracking process on a basis of the generated dynamic response recipe.

2. The method according to claim 1,
wherein the response body comprises a generated fake response to cause the at least one client device to no longer send application programming interface requests related to the tracking service.

3. The method according to claim 1, further comprising prior to sending initial requests to the tracking service and in the event that one or more tracking fields with user specific data are identified in the request body, selecting random tracking field data and replacing the user specific data of the one or more tracking fields with the selected random tracking field data respectively when generating the initial requests.

4. The method according to claim 3, further comprising maintaining a database of predetermined tracking field data collected from the set of client devices, and selecting the random tracking field data from the database and replacing the user specific data of the one or more tracking fields with the retrieved tracking field data respectively.

5. The method according to claim 1, wherein the step of identifying the API request being related to the tracking service further comprises analysing network traffic data of at least partly intercepted network traffic to identify any elements indicative of the tracking process, wherein analysing the network traffic comprises identifying the elements indicative of the tracking process by querying uniform resource locator (URL) reputation from a URL reputation database maintaining data of tracking URLs.

6. The method according to claim 1, wherein unique cookies, ETag values and other identifiers are removed or replaced with other values prior to sending initial requests to the tracking service.

7. The method according to claim 1, wherein the step of analysing body objects of the stored responses and dynamically generating a response recipe on the basis of the analysis further comprises: in the event a majority of the responses given to different clients are detected to be the exactly equal, positive responses, storing said response as a static response recipe for serving as a response to further queries.

8. The method according to claim 7, further comprising ignoring any ETag values, cookies or predetermined custom headers from the response or replacing them with random values.

9. The method according to claim 1, wherein the step of analysing body objects of the stored responses and generating a dynamic response recipe on the basis of the analysis further comprises: processing a series of binary diff operations on the initial requests and the respective responses for finding variable fields and the largest common template.

10. The method according to claim 1, wherein the dynamic response recipe provides a response template comprising any of: format strings for generating random text snippets, hexadecimal strings, UUID (universally unique identifier)-like strings or other formatted random strings of correct length to match the respective real responses, format string referring to URL parameters or cookies values given in the request.

11. The method according to claim 10, wherein the response template requires replacing one or more tracking fields of the response body requiring user specific data with other data.

12. The method according to claim 1, further comprising storing the response recipe in the database with a time-to-live field triggering a regeneration of the response recipe after a predetermined time interval.

13. An apparatus for use in a communications network, the apparatus comprising:
a processor arranged to identify an application programming interface request from at least one client device of a set of client devices being related to a tracking service;
a processor arranged to send a predetermined number of initial requests to the tracking service when processing application programming interface requests to the tracking service;
a processor arranged to store the initial requests and the respective responses from the API in a database;
a processor arranged to analyse body objects of the stored initial requests and the respective responses;
a processor arranged to dynamically generate a dynamic response recipe related to the tracking service on a basis of the analysis;
a processor arranged to search a database for a previously generated response recipe related to the dynamically generated response recipe; and
based on the previously generated response recipe being found in the database, a processor arranged for each further application programming interface request related to the tracking service generate a response comprising a response body acceptable by a tracking process on a basis of the generated dynamic response recipe.

14. The apparatus according to claim 13, wherein the response body comprises a generated fake response to cause the at least one client device to no longer send application programming interface requests related to the tracking service.

15. The apparatus according to claim 13, wherein the processor is further arranged to select random tracking field data and replace user specific data of the one or more tracking fields with the selected random tracking field data respectively when generating the initial requests prior to sending initial requests to the tracking service and in the event that one or more tracking fields with user specific data are identified in the request body.

16. The apparatus according to claim 15, wherein the processor is further arranged to maintain a database of predetermined tracking field data collected from the set of client devices, and select the random tracking field data from the database and replace the user specific data of the one or more tracking fields with the retrieved tracking field data respectively.

17. The apparatus according to claim 13, wherein when identifying the API request being related to the tracking service, the processor is further arranged to analyse network traffic data of at least partly intercepted network traffic to identify any elements indicative of the tracking process, wherein analysing the network traffic comprises identifying the elements indicative of the tracking process by querying uniform resource locator (URL) reputation from a URL reputation database maintaining data of tracking URLs.

18. The apparatus according to claim 13, wherein the processor is further arranged to remove or replace unique cookies, ETag values and other identifiers with other values prior to sending initial requests to the tracking service.

19. The apparatus according to claim 13, wherein in the event a majority of the responses given to different clients are detected to be the exactly equal, positive responses, the processor is further arranged to store said response as a static response recipe for serving as a response to further queries.

20. The apparatus according to claim 19, wherein the processor is further arranged to ignore any ETag values, cookies or predetermined custom headers from the response or replace them with random values.

21. The apparatus according to claim 13, wherein the processor is further arranged to process a series of binary diff operations on the initial requests and the respective responses for finding variable fields and the largest common template when analysing body objects of the stored responses and generating a dynamic response recipe.

22. The apparatus according to claim 13, wherein the processor is further arranged to store the response recipe in the database with a time-to-live field triggering a regeneration of the response recipe after a predetermined time interval.

23. A non-transitory computer storage medium having stored thereon a computer program code for implementing the method of claim 1.

* * * * *